United States Patent
Harazawa et al.

(10) Patent No.: US 9,881,752 B2
(45) Date of Patent: Jan. 30, 2018

(54) ROTARY-TYPE SWITCH

(71) Applicants: TRAM, INC., Plymouth, MI (US);
KABUSHIKI KAISHA TOKAI RIKA DENKI SEISAKUSHO, Aichi (JP)

(72) Inventors: Makoto Harazawa, Novi, MI (US);
Mizuki Kamiya, Northville, MI (US);
Nobuaki Saito, Farmington Hills, MI (US); Yuta Yamanishi, Ypsilanti, MI (US); Hiroaki Yamaguchi, Novi, MI (US)

(73) Assignees: KABUSHIKI KAISHA TOKAI RIKA DENKI SEISAKUSHO, Aichi (JP);
TRAM INC., Plymouth, MI (US)

( * ) Notice: Subject to any disclaimer, the term of this patent is extended or adjusted under 35 U.S.C. 154(b) by 79 days.

(21) Appl. No.: 14/957,193

(22) Filed: Dec. 2, 2015

(65) Prior Publication Data
US 2017/0162347 A1 Jun. 8, 2017

(51) Int. Cl.
*H01H 19/11* (2006.01)
*H01H 19/14* (2006.01)
(Continued)

(52) U.S. Cl.
CPC .............. *H01H 19/14* (2013.01); *H01H 9/56* (2013.01); *H01H 19/025* (2013.01);
(Continued)

(58) Field of Classification Search
CPC ...... H01H 25/065; H01H 19/11; H01H 19/46; H01H 19/48; H01H 19/50; H01H 19/52; H01H 19/54
(Continued)

(56) References Cited

U.S. PATENT DOCUMENTS

| 6,525,277 B2* | 2/2003 | Oba ..................... H01H 13/807 200/4 |
| 7,238,904 B2* | 7/2007 | Ogawa ................ B60H 1/0065 200/336 |

(Continued)

FOREIGN PATENT DOCUMENTS

| DE | 10 2013 021 874 | 6/2015 |
| EP | 1 443 533 | 8/2004 |

(Continued)

OTHER PUBLICATIONS

Extended European Search Report for EP 16199290.4 dated Apr. 12, 2017.

*Primary Examiner* — Felix O Figueroa
(74) *Attorney, Agent, or Firm* — Greenblum & Bernstein, P.L.C.

(57) ABSTRACT

A rotary-type switch for controlling vehicle lighting is provided. The rotary-type switch may include a housing portion that includes multiple positions that respectively correspond to multiple operation modes and a rotary dial being configured to rotate relative to the housing portion to select an operation mode of the rotary-type switch based on a position identified by a selection indicator. A controller is configured to control and operation mode of the rotary-type switch based on a vehicular power state and when the vehicular power state is OFF, regardless of the position of the selection indicator corresponding to the selected operation mode on either the housing portion or the rotary dial, the controller controls the rotary-type switch to automatically set the operation mode to that defined by an initial-operation position corresponding to a predetermined initial-operation mode.

6 Claims, 16 Drawing Sheets

(51) Int. Cl.
*H01H 19/02* (2006.01)
*H01H 19/54* (2006.01)
*H01H 9/56* (2006.01)
*H01H 25/06* (2006.01)

(52) U.S. Cl.
CPC ............ *H01H 19/11* (2013.01); *H01H 19/54* (2013.01); *H01H 25/065* (2013.01); *H01H 2221/01* (2013.01)

(58) Field of Classification Search
USPC .................................. 200/564, 11 R, 14, 336
See application file for complete search history.

(56) References Cited

U.S. PATENT DOCUMENTS

| | | | |
|---|---|---|---|
| 7,550,685 B2* | 6/2009 | Tsuduki | H01H 25/041 200/14 |
| 8,796,566 B2* | 8/2014 | Kerner | H01H 19/11 200/4 |
| 2006/0037424 A1 | 2/2006 | Pickering et al. | |
| 2015/0035434 A1 | 2/2015 | Bummel et al. | |
| 2015/0035435 A1 | 2/2015 | Alberti et al. | |

FOREIGN PATENT DOCUMENTS

| | | |
|---|---|---|
| JP | 2015-107669 | 6/2015 |
| WO | 2010/076589 | 7/2010 |

\* cited by examiner

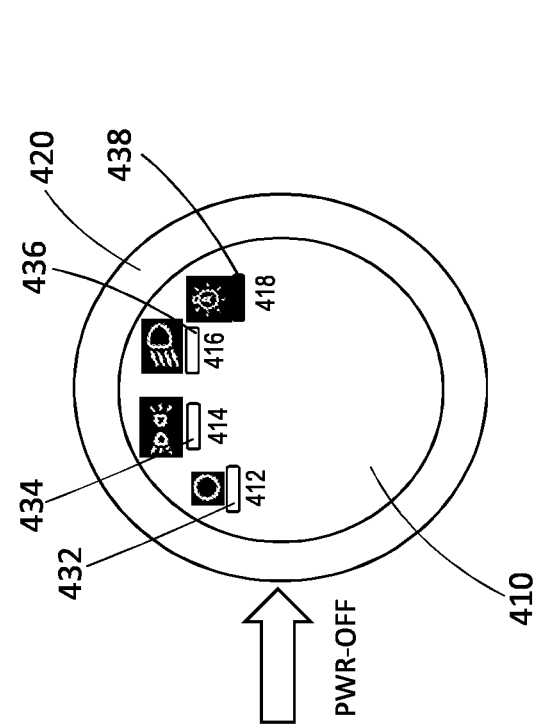
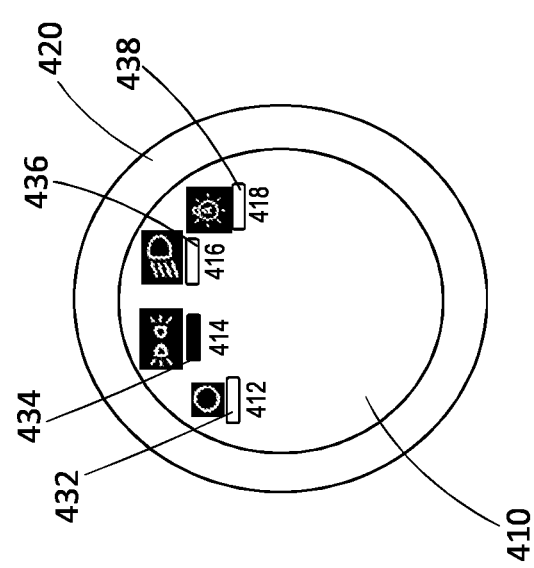

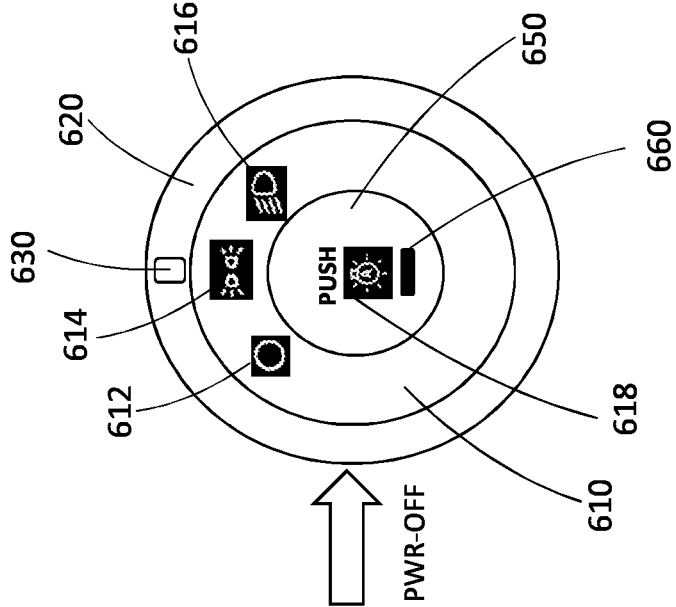
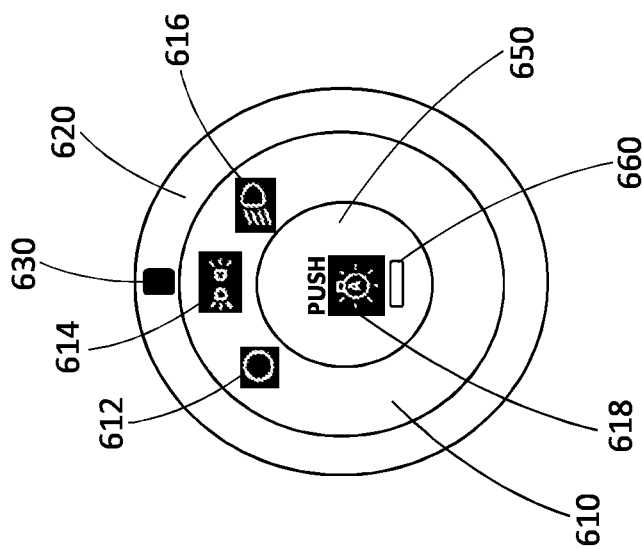

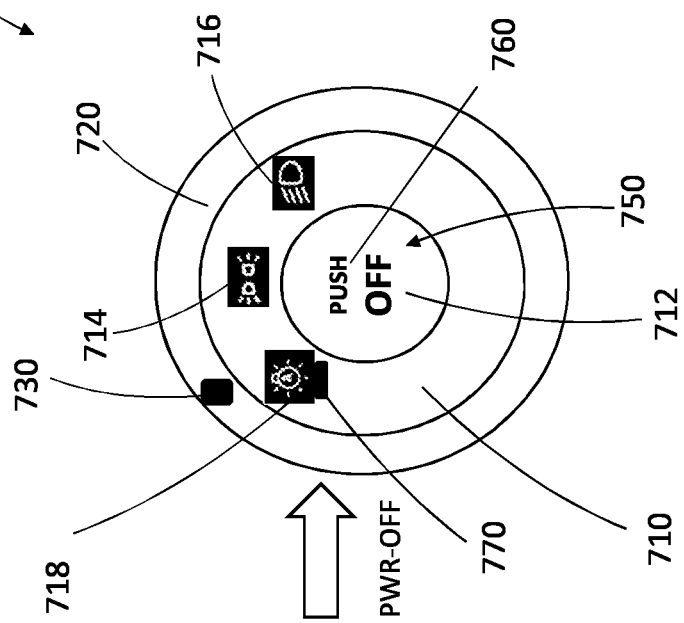
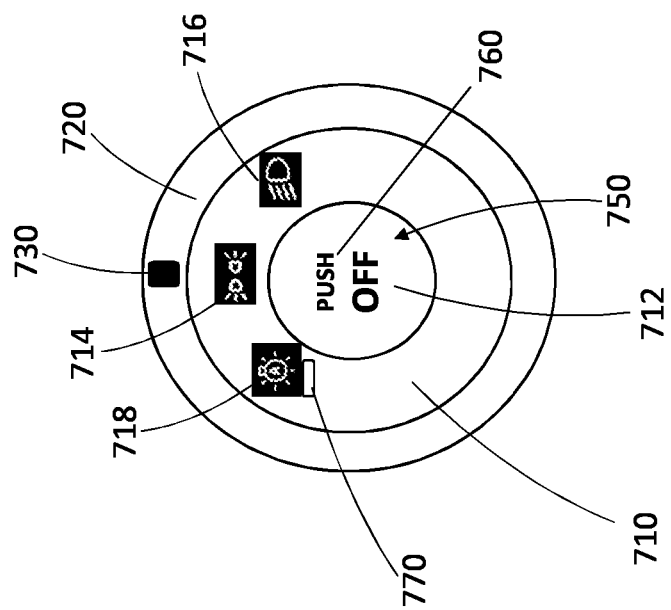

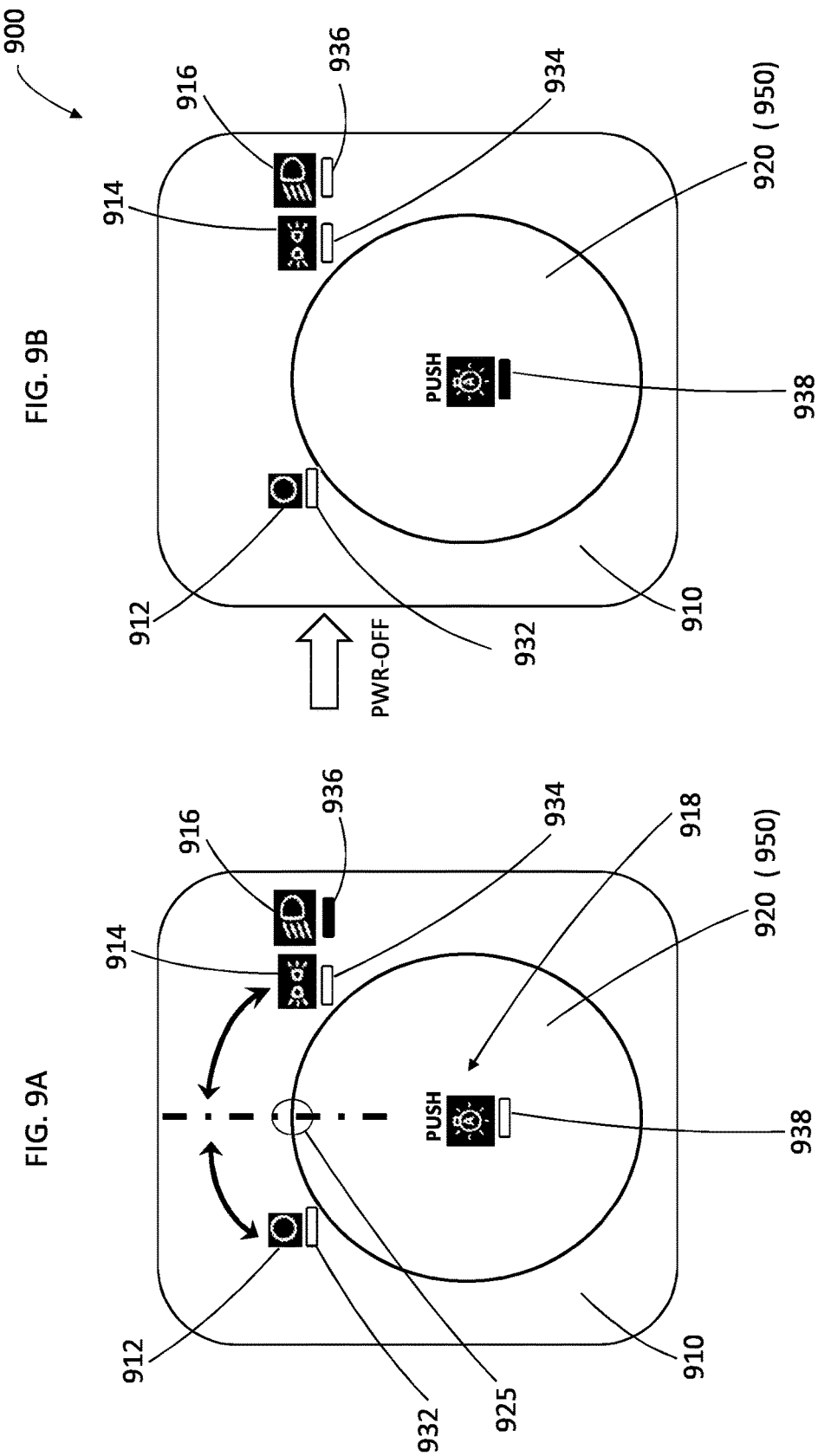

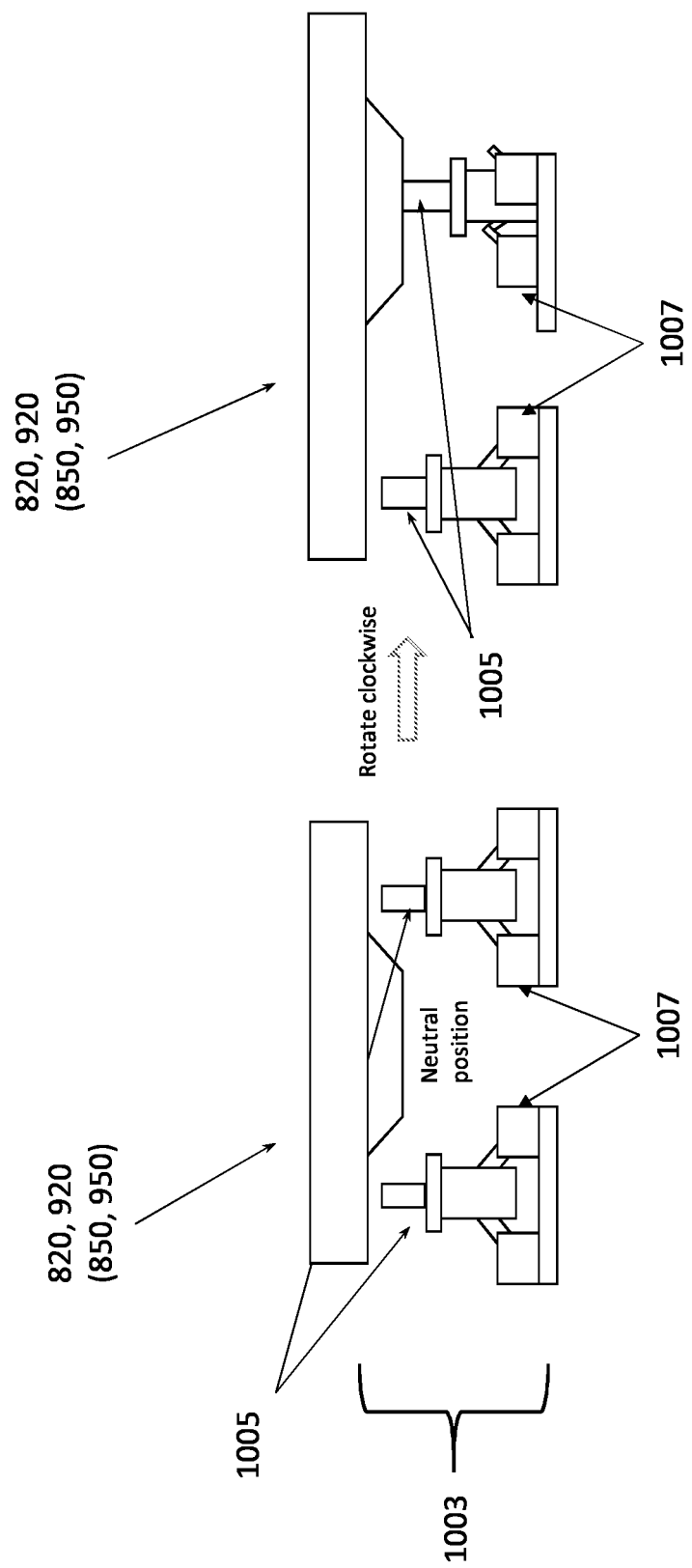

ROTARY-TYPE SWITCH

BACKGROUND

1. Field of the Disclosure

The present disclosure relates to the field of vehicular lighting systems. More particularly, the present disclosure relates to rotary-type switches that control exterior lighting of a vehicle.

2. Background Information

Exterior vehicular lighting systems are configured to operate in various ways depending on road conditions, governmental regulations and user preference. These lighting systems have been known to be controlled by various rotary-type switches that require user input so as to allow motorists to conveniently select an operation mode of the lighting system according to their needs and/or preference.

Summary of the Disclosure

However, because existing rotary-type switches are dependent on motorist user input there are growing concerns related to motorist safety and user error in the proper operation and usage of the existing lighting systems when the vehicle is being operated. Thus, there is a need to design a rotary-type switch that increases motorist safety and minimizes user input.

According to non-limiting embodiments of the present application, a rotary-type switch for controlling vehicle lighting may be provided. The rotary-type switch may include a stationary housing portion that includes a plurality of positions that respectively correspond to a plurality of operation modes of the rotary-type switch, and a latch-type rotary dial that includes a selection indicator and surrounds the stationary housing portion. The latch-type rotary dial may be configured to selectively rotate relative to the stationary housing portion to align the selection indicator with one of the plurality of positions for an operation mode selection.

In embodiments, a controller may be configured to control a position of the latch-type rotary dial corresponding to one of the plurality of operation modes of the rotary-type switch based on one of an OFF vehicular power state or an ON vehicular power state.

In embodiments, the plurality of positions may include an initial-operation position corresponding to a predetermined initial-operation mode of the plurality of operation modes, and when the vehicular power state is OFF, regardless of the position of the selection indicator corresponding to the selected operation mode on the stationary housing portion, the controller may control the latch-type rotary dial to automatically rotate to the initial-operation position corresponding to the predetermined initial-operation mode, such that when the vehicular power state is ON, the predetermined initial-operation mode is actuated.

In embodiments, the plurality of positions may include at least one rotation end position that prevents the latch-type rotary dial from further rotation in a rotational direction, the latch-type rotary dial may be configured to be releasably held at each of the plurality of positions, and the selection indicator may be an illuminable light source.

According to non-limiting embodiments of the present application, the rotary-type switch for controlling vehicle lighting may include a stationary housing portion that includes a plurality of positions that respectively correspond to a plurality of operation modes of the rotary-type switch, where each position of the plurality of positions includes a selection indicator that identifies a selected operation mode, and a free rotation-type rotary dial that surrounds the stationary housing portion and is configured to freely rotate relative to the stationary housing portion and select one of the plurality of operation modes at the corresponding position identified by the selection indicator on the stationary housing portion.

In embodiments, a controller may be configured to set an operation mode of the rotary-type switch based on one of an OFF vehicular power state or an ON vehicular power state, and the plurality of positions includes an initial-operation position corresponding to a predetermined initial-operation mode, and when the vehicular power state is OFF, regardless of the operation mode identified by the selection indicator at any one of the plurality of positions on the stationary housing portion, the controller controls the rotary-type switch to automatically set the operation mode to the predetermined initial-operation mode corresponding to the initial-operation position identified by the selection indicator on the stationary housing portion, such that when the vehicular power state is ON, the predetermined initial-operation mode is actuated.

In embodiments, the rotary-type switch is configured to associate a rotation range of the free rotation-type rotary dial with one of the plurality of positions corresponding to one of the plurality of operation modes identified by the corresponding selection indicator on the stationary housing portion, and the selection indicator is an illuminable light source.

According to non-limiting embodiments of the present application, the rotary-type switch for controlling vehicle lighting may include a stationary housing portion that includes a plurality of positions that respectively correspond to a plurality of operation modes of the rotary-type switch, and a latch-type rotary dial that includes a selection indicator and surrounds the stationary housing portion, the latch-type rotary dial being configured to selectively rotate relative to the stationary housing portion to align the selection indicator with one of the plurality of positions for an operation mode selection.

In embodiments, a controller may be configured to control a position of the latch-type rotary dial corresponding to one of the plurality of operation modes of the rotary-type switch based on one of an OFF vehicular power state or an ON vehicular power state, the plurality of positions may include a position that is defined by a push button that is provided at the stationary housing portion, and the plurality of operation modes may include an operation mode defined by actuation of the push button.

In embodiments, when the push button is actuated, regardless of the selected operation mode corresponding to the position identified by the selection indicator, the controller controls the rotary-type switch to automatically set the operation mode to the operation mode defined by actuation of the push button.

In embodiments, the plurality of positions includes an initial-operation position corresponding to a predetermined initial-operation mode of the plurality of operation modes, and when the vehicular power state is OFF, regardless of the position of the selection indicator corresponding to the selected operation mode, the controller controls the rotary-type switch to automatically set the operation mode to the predetermined initial-operation mode corresponding to the initial-operation position such that when the vehicular power state is ON, the predetermined initial-operation mode is actuated.

In embodiments, the position of the push button is the initial-operation position corresponding to the predetermined initial-operation mode, and when the vehicular power state is OFF, regardless of the position of the selection indicator corresponding to the selected operation mode, the controller controls the rotary-type switch to automatically set the operation mode to the predetermined initial-operation mode corresponding to the initial-operation position at the push button such that when the vehicular power state is ON, the predetermined initial-operation mode is actuated.

In embodiments, one of the plurality of positions defined outside of the push button is the initial-operation position corresponding to the predetermined initial-operation mode, and when the vehicular power state is OFF, regardless of the position of the selection indicator corresponding to the selected operation mode, the controller controls the latch-type rotary dial to automatically rotate the selection indicator to the initial-operation position corresponding to the predetermined initial-operation mode such that when the vehicular power state is ON, the predetermined initial-operation mode is actuated.

According to non-limiting embodiments of the present application, the rotary-type switch for controlling vehicle lighting may include a panel portion that includes a plurality of positions that respectively correspond to a plurality of operation modes of the rotary-type switch, where each position of the plurality of positions includes a selection indicator that identifies a selected operation mode, and a momentary-type rotary dial that is biased toward a home position and configured to rotate relative to the panel portion and select one of the plurality of operation modes at the corresponding position identified by the corresponding selection indicator on the panel portion.

In embodiments, the momentary-type rotary dial may include a prioritized-access position corresponding to a prioritized-access operation mode identified by a prioritized-access selection indicator defined at a push button provided on the momentary-type rotary dial.

In embodiments, a controller may be configured to control an operation mode of the rotary-type switch based on one of an OFF vehicular power state or an ON vehicular power state, and when the push button is actuated, regardless of the selected operation mode on either the panel portion or the push button, the controller controls the rotary-type switch to set the operation mode to that defined by actuation of the push button, and when the vehicular power state is OFF, regardless of the position of the selection indicator corresponding to the selected operation mode on either the panel portion or the push button, the controller controls the rotary-type switch to automatically set the operation mode to a predetermined initial-operation mode defined by an initial-operation position corresponding to one of either the push button or one of the plurality of positions on the panel portion, such that when the vehicular power state is ON, the predetermined initial-operation mode is actuated.

In embodiments, the momentary-type rotary dial may include a detent on a rear surface thereof that is configured to engage a rotation detector.

In embodiments, the detent is defined by a plurality of inclined surfaces, each of the inclined surfaces corresponding to one of the plurality of positions corresponding to one of the plurality of operation modes identified by the corresponding selection indicator on the panel portion.

In embodiments, when the momentary-type rotary dial is in the home position, a portion of the rotation detector is retained within the detent, and when the momentary-type rotary dial is partially rotated within a predetermined rotation range, a first inclined surface of the plurality of inclined surfaces moves relative to the rotation detector such that the rotary-type switch is actuated to select one of the plurality of operation modes identified by the corresponding selection indicator on the panel portion. When the momentary-type rotary dial is further rotated within the predetermined rotation range, the rotation detector is moved relative to a second inclined surface of the plurality of inclined surfaces such that the rotary-type switch is actuated to select another one of the plurality of operation modes identified by the corresponding selection indicator on the panel portion.

In embodiments, the first inclined surface has a slope angle different than a slope angle of the second inclined surface such that a change in slope angle between any of the plurality of inclined surfaces corresponds to a different position and operation mode identified by the corresponding selection indicator on the panel portion.

In embodiments, the rotary switch may be configured to associate the number of rotations of the momentary-type rotary dial away from the home position and back with one of the plurality of positions corresponding to one of the plurality of operation modes identified by the corresponding selection indicator on the panel portion, and the selection indicator is an illuminable light source.

Other aspects and advantages of the present disclosure will become apparent from the following description taken in conjunction with the accompanying drawings, illustrated by way of example, the spirit of the invention.

BRIEF DESCRIPTION OF THE DRAWINGS

FIGS. 4A and 4B show an exemplary, non-limiting embodiment of a free rotation-type rotary switch, according to aspects of the present disclosure.

FIGS. 6A and 6B show an exemplary, non-limiting embodiment of a latch-type rotary switch including a push button, according to aspects of the present disclosure.

FIGS. 7A and 7B show another exemplary, non-limiting embodiment of a latch-type rotary switch including a push button, according to aspects of the present disclosure.

FIGS. 9A and 9B show another exemplary, non-limiting embodiment of a momentary-type rotary switch, according to aspects of the present disclosure.

FIG. 9C shows a side view of an exemplary, non-limiting embodiment of a momentary-type rotary switch, according to aspects of the present disclosure.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1B:
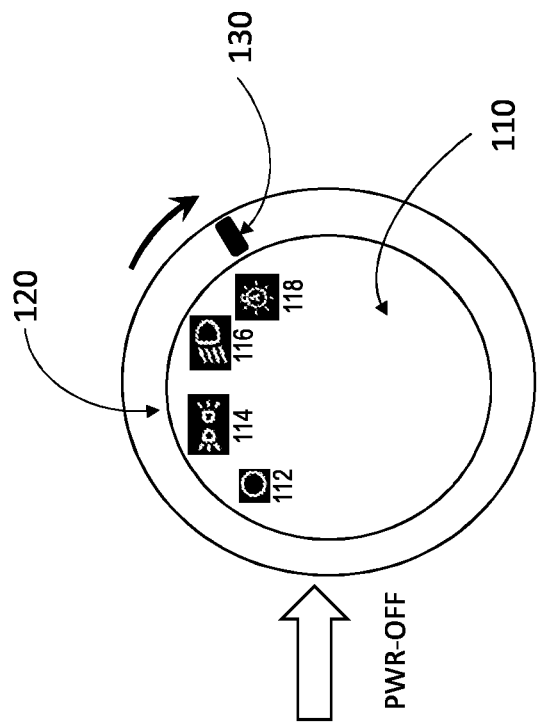
FIGS. 1A and 1B show an exemplary, non-limiting embodiment of a latch-type rotary switch, according to aspects of the present disclosure.
Figure 1A:
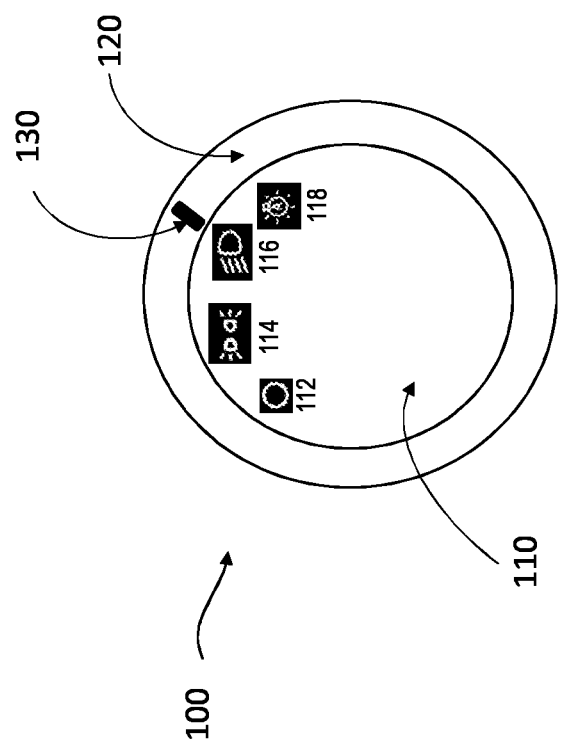

A non-limiting embodiment of a latch-type rotary switch 100 will be described with reference to FIGS. 1A, 1B, 1C, 1D, 2 and 3. As shown in FIGS. 1A and 1B, the latch-type rotary switch 100 controls an exterior vehicle lighting system. The latch-type rotary switch 100 includes a stationary housing portion 110 that includes a plurality of positions 112, 114, 116, 118 that respectively correspond to a plurality of operation modes of the rotary-type switch. In embodiments, the operation modes relate to functions of the vehicle lighting system. For example, the operation modes may include an OFF function, a TAIL (or hazard light) function, HEAD (or low beam) function, and an AUTO (day-time running light) function. The operation modes may also include a high beam function as well as operation modes for specialty vehicles (e.g., police, military, and industrial vehicles, and boats, planes, motorcycles and trains) including, e.g., a spot-light function, an emergency light with or without an optional siren function, etc. One of the plurality of positions 112, 114, 116, 118 is an initial-operation position corresponding to a predetermined initial-operation mode of the plurality of operation modes. In embodiments, position 118 may be the initial-operation position and the predetermined initial-operation mode may correspond to operation of the AUTO function (or day-time running lights).

The latch-type rotary switch 100 also includes a latch-type rotary dial 120 that includes a selection indicator 130 and surrounds the stationary housing portion 110. The latch-type rotary dial 120 is configured to selectively rotate relative to the stationary housing portion 110 to align the selection indicator 130 with one of the plurality of positions 112, 114, 116, 118 for an operation mode selection. The latch-type rotary dial 120 is generally cylindrical in shape although it is contemplated that the latch-type rotary dial 120 may be any shape suitable for convenient grasping and rotation of the same including, e.g., cube-shaped, polygonal-shaped or any other ergonomic shape. In embodiments, the latch-type rotary dial 120 is configured to be releasably held by a latch mechanism at each of the plurality of positions via a clockwise or counter-clockwise rotation. For example, during operation of the vehicle, the motorist may rotate the latched dial to switch from the AUTO function to the HEAD function to improve road vision under night driving conditions.

Figure 1C:
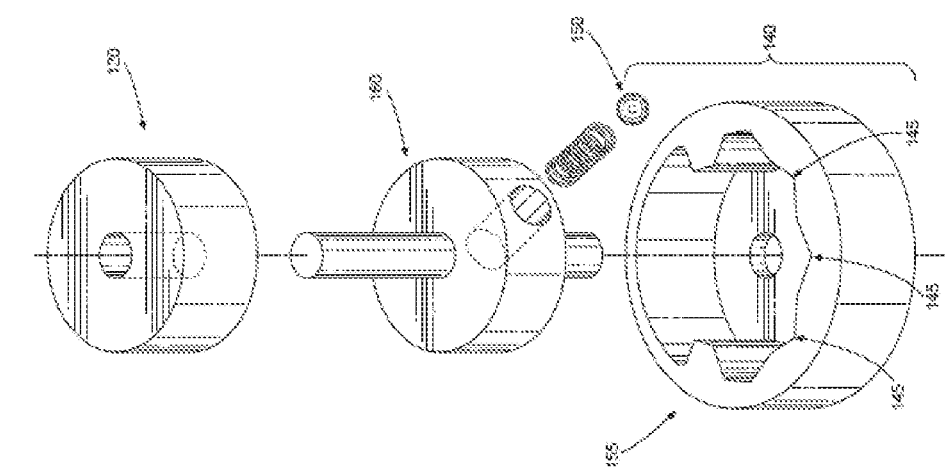
FIG. 1C shows an exemplary, non-limiting embodiment of a latch mechanism of a latch-type rotary switch, according to aspects of the present disclosure.
Figure 1D:
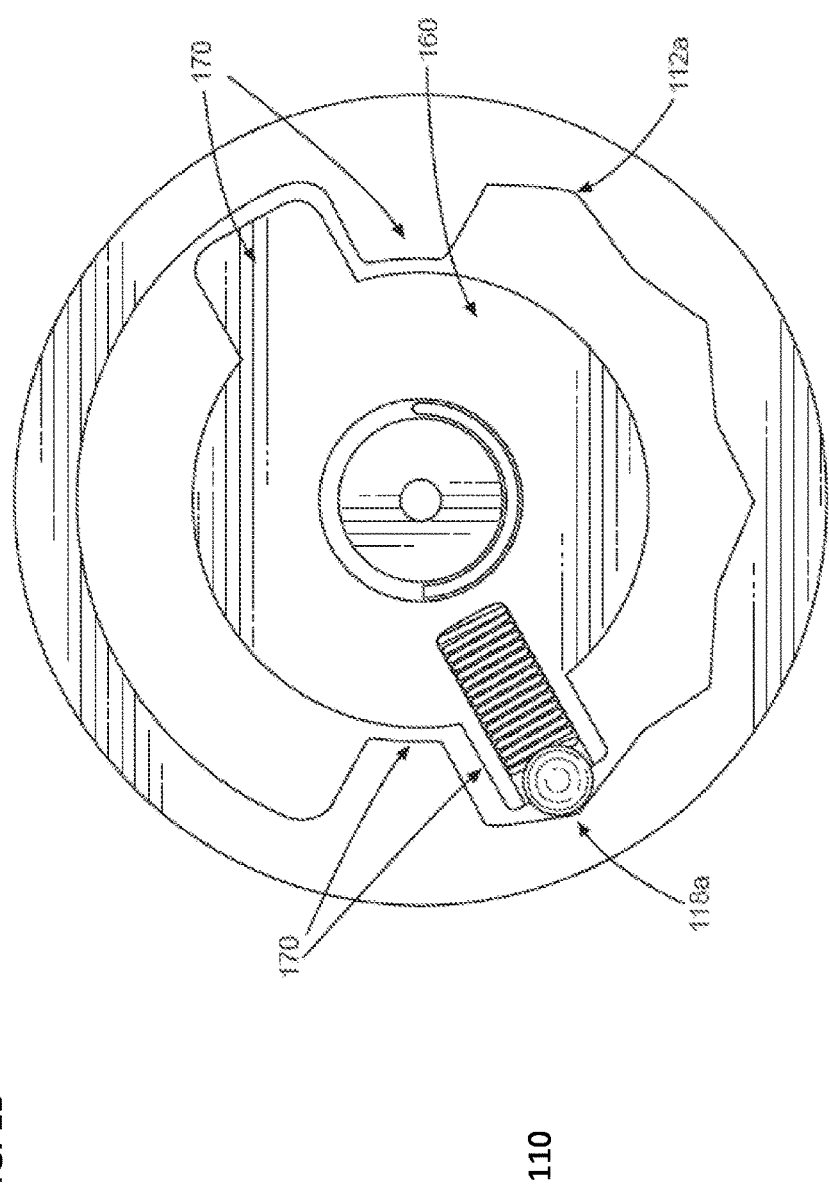
FIG. 1D shows an exemplary, non-limiting embodiment of a stopper structure of a latch-type rotary switch, according to aspects of the present disclosure.

As shown, e.g., in FIG. 1C, a non-limiting embodiment of a latch mechanism 140 is shown. The latch mechanism 140 is defined by latching surfaces 145 and a biasing pin 150. Each of latching surface 145 is associated with one of the plurality of positions 112, 114, 116, 118 corresponding to each of the plurality of operation modes. The latching surfaces 145 are defined by an inner wall of a casing 155 of the latch-type rotary dial assembly 100 and the biasing pin 150 projects from an outer peripheral surface of a rotor 160 disposed within the casing 155. The biasing pin 150 is configured to disengagably latch with each of the latching surfaces 145 defined by the casing 155. The rotor 160 is connected to the latch-type rotary dial 120 so as to rotate with the rotation of the latch-type rotary dial 120.

When the biasing pin 150 is in a resting state, the biasing pin 150 is biased to project outward from the peripheral surface of the rotor 160 to secure the biasing pin 150 in one of the latch surfaces 145. During rotation of the latch-type rotary dial 120, the biasing pin 150 is urged against its biasing direction and away from the latching surface 145 back toward the rotor to allow the latch-type rotary dial 120 to rotate so that the biasing pin 150 is rotated to another latching surface 145 corresponding to another operation mode. When the latch-type rotary dial 120 reaches the position of the latching surface 145 corresponding to the selected operation mode, the biasing pin 150 is returned to its rest position so as to latch the biasing pin 150 into the latching surface 145 and the latch-type rotary dial 120 into the selected position corresponding to the selected operation mode. The latching surfaces 145 are concave surfaces provided at spaced intervals within the casing 155, although it is contemplated that the latching surfaces 145 could be any discrete section of the casing configured to selectively and releasably retain the biasing pin 150. The biasing pin 150 is a spherical pin biased by a spring, although it is contemplated that the biasing pin 150 could be any elastically deformable member such as an elastomeric projection removably retained (e.g., friction fit) in each of the latching surfaces 145. In addition, while the latching surface 145/biasing pin 150 latch structure is described above, it is contemplated that other latch mechanisms may be incorporated in the latch-type rotary switch 100 to releasably hold the latch-type rotary dial 120 at each of the plurality of positions via a clockwise or counter-clockwise rotation. For example, a magnet-type latch mechanism or a slide lock-type latch mechanism may be employed instead.

The plurality of positions include at least one rotation end position 112a or 118a defined such that the latch-type rotary dial 120 is prevented from further rotation in a rotational direction. As shown, e.g., in FIG. 1D, one or more stoppers 170 may be provided at the at least one rotation end position 112a or 118a to prevent further rotation of the latch-type rotary dial 120 relative to the stationary housing portion 110.

The stopper(s) 170 may be provided on the latch-type rotary dial 120, the stationary housing portion 110, the casing 155, the rotor 160 or any combination of the latch-type rotary switch structures, to stop the latch-type rotary dial 120 from attempting to rotate to a position beyond the rotation end position 112a or 118a. Such a structure is provided at the rotation end position 112a or 118a not only to stop rotation but also, e.g., to enhance feedback to the motorist that the appropriate operation mode selection has been made when, e.g., the motorist is otherwise focused on the road ahead and cannot rely on visual confirmation of the selected mode operation.

Figure 2:
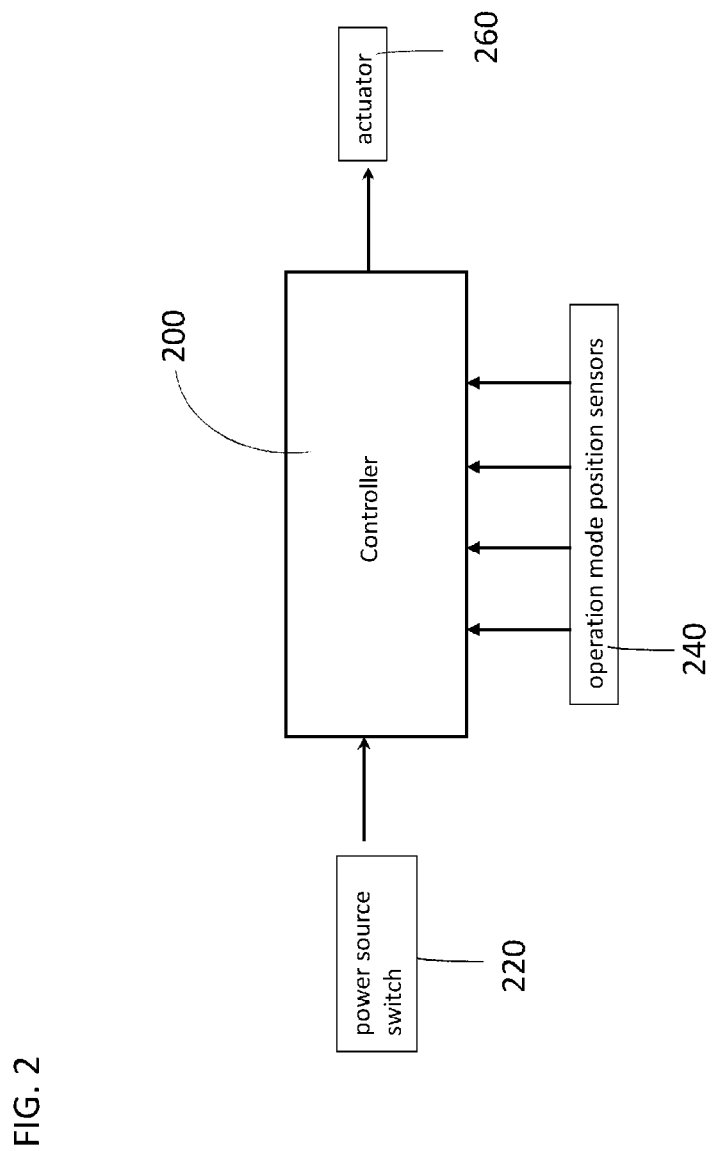
FIG. 2 shows a block diagram of an exemplary, non-limiting embodiment of a rotary-type switch control system, according to aspects of the present disclosure.

As shown in FIG. 2, a controller 200 of the rotary-type switch control system is configured to control a position of the latch-type rotary dial 120 corresponding to one of the plurality of operation modes of the rotary-type switch based on one of an OFF vehicular power state or an ON vehicular power state. As shown, the controller 200 is connected to at least one power switch 220 for detecting the ON/OFF state of the vehicular power source, a plurality of operation mode position sensors 240 for detecting the plurality of positions corresponding to the plurality of operation modes, and an actuator 260 for at least one of rotating the latch-type rotary dial 120 to any one of the plurality of positions based on input received by the controller 200, or for actuating a switch associated with each of the plurality of operation position sensors 240 so as to set the operation mode in any one of the plurality of positions based on input received by the controller 200 (without rotation of the latch-type rotary dial 120), so as to initiate the selected vehicle lighting function. In embodiments, the controller 200 may be an electronic control unit (ECU) tasked to control operation of the vehicle lighting system, the detected power state may be a detection of a power state of a vehicle engine, a vehicle battery, a vehicle electric motor, or any combination of vehicle power sources required to drive a vehicle, and the actuator 260 may be a motor that rotates the latch-type rotary dial 120 and/or a sensor that communicates with the switches so as to set the operation mode and allow the selected vehicle lighting function to be initiated.

In operation, when the controller 200 detects that the vehicular power state is OFF, regardless of the position of the selection indicator 130 corresponding to the selected operation mode on the stationary housing portion 110, the controller 200 controls the latch-type rotary dial 120 to automatically rotate to the initial-operation position corresponding to the predetermined initial-operation mode such that when the vehicular power state is ON, the predetermined initial-operation mode is actuated. As shown in FIGS. 1A and 1B, when the vehicular power state is OFF the selection indicator switches from the HEAD function to the AUTO function. It is also contemplated that while the controller 200 detects that the vehicular power state is OFF, the controller 200 may also be configured to rotate the latch-type rotary dial 120 when the vehicular power states switches from OFF to ON to switch from the HEAD function to the AUTO function.

Thus, e.g., when a motorist operates a vehicle, the motorist may select a lighting system operation mode for performing the HEAD function of the lighting system to illuminate the road during night driving conditions. When operation of the vehicle ceases and the engine is turned OFF, the user may fail to turn off the selected operation mode. In this situation, the controller 200 detects that the engine is OFF (via the power switch 220) and that the position of the selection indicator 130 corresponds to the HEAD function (via the operation mode position sensors 240). The controller 200 then communicates with the actuator 260 to automatically rotate the latch-type rotary dial 120 from the HEAD function position 116 to the initial-operation position 118 such that when the controller 200 detects that the vehicular power state is switched ON, the AUTO function (i.e., the predetermined initial-operation mode), and not the HEAD function, is actuated.

The selection indicator 130 is an illuminable light source (e.g., an LED) that illuminates when the selection indicator 130 is aligned with a position that corresponds to a selected operation mode. While the selection indicator 130 may illuminate on the latch-type rotary dial 120, a symbol identifying the function of the selected operation mode may also illuminate on the stationary housing portion 110. In addition, the illuminated light sources may have any one of or combination of multi-color, flashing or intermittent lighting functionality as well.

Figure 3:
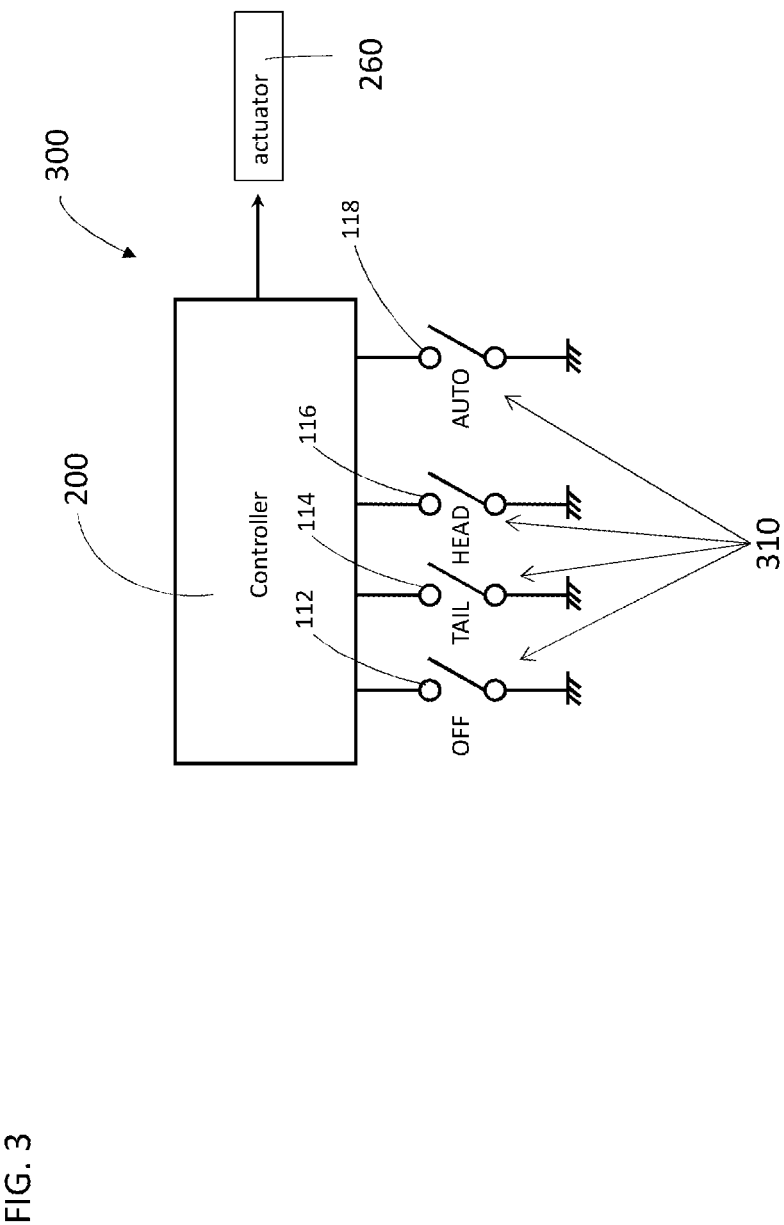
FIG. 3 shows an exemplary, non-limiting embodiment of a rotary-type switch electrical circuit suitable for use with a latch-type rotary switch, according to aspects of the present disclosure.

As shown in FIG. 3, a rotary-type switch electrical circuit 300 suitable for use with the latch-type rotary switch 100 is provided. When the vehicle power source is ON, the latch-type rotary dial 120 may be rotated such that a switch 310 corresponding to each of the plurality of positions 112, 114, 116, 118 on the stationary housing portion 110 may be actuated. When the latch-type rotary dial 120 aligns with any one of the plurality of positions 112, 114, 116, 118 the corresponding switch 310 completes the circuit and the controller 200 communicates with the vehicle lighting system to perform the function of the selected operation mode that corresponds to the actuated switch 310.

When the vehicle power source is OFF, regardless of the aligned position of the selection indicator and the selected operation mode, the switch corresponding to the initial operation mode is actuated and the controller 200 communicates with the actuator 260 to rotate the latch-type rotary dial 120 to the position corresponding to the predetermined initial-operation mode. Once aligned, the circuit is complete and when the controller 200 detects that the vehicular power state is switched ON, the controller 200 communicates with the vehicle lighting system to actuate the function of the predetermined initial-operation mode.

Figure 4C:
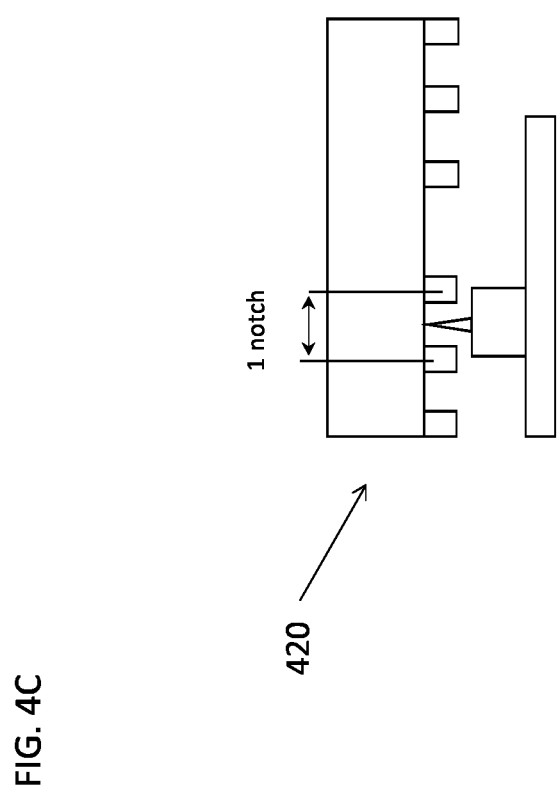
FIG. 4C shows an exemplary, non-limiting embodiment of a side view of a free rotation-type rotary switch, according to aspects of the present disclosure.

A non-limiting embodiment of a free rotation-type rotary switch 400 will be described with reference to FIGS. 2, 4A, 4B, 4C and 5. As shown in FIGS. 4A and 4B, the free rotation-type rotary switch 400 controls an exterior vehicle lighting system. The free rotation-type rotary switch 400 includes a stationary housing portion 410 that includes a plurality of positions 412, 414, 416, 418 that respectively correspond to a plurality of operation modes of the rotary-type switch, wherein each position of the plurality of positions includes a selection indicator 432, 434, 436, 438 that identifies a selected operation mode. As indicated above with respect to the latch-type rotary switch 100, the operation modes here may also relate to functions of the vehicle lighting system and thus further discussion of the same is omitted here. In embodiments, the plurality of positions 412, 414, 416, 418 includes an initial-operation position, e.g., position 418, corresponding to a predetermined initial-operation mode, e.g., the AUTO function.

The selection indicators 432, 434, 436, 438 are provided on an uppermost surface of the stationary housing portion 410 so that the selected operation mode can be readily and reliably seen without obstruction by other components of the free rotation-type rotary switch 400.

The free rotation-type rotary switch 400 also includes a free rotation-type rotary dial 420 that surrounds the stationary housing portion 410 and is configured to freely rotate relative to the stationary housing portion 410 and select one of the plurality of operation modes at the corresponding position 412, 414, 416, 418 identified by the selection indicator 432, 434, 436, 438 on the stationary housing portion 410. The free rotation-type rotary dial 420 is rotatable in either the clockwise or counterclockwise direction such that regardless of the rotation direction, the free rotation-type rotary dial 420 may be rotated to any one of the plurality of positions corresponding to any one of the operation modes.

The rotary switch is configured to associate a rotation range of the free rotation-type rotary dial 420 with one of the plurality of positions 412, 414, 416, 418 corresponding to one of the plurality of operation modes identified by the corresponding selection indicator on the stationary housing portion 410, the details of which are described below.

As shown in FIG. 2, the rotary-type switch controller 200 may also be configured to control a position of the free rotation-type rotary dial 420 corresponding to one of the plurality of operation modes of the rotary-type switch based on one of an OFF vehicular power state or an ON vehicular power state. As shown, the controller 200 is connected to at least one power switch 220 for detecting the ON/OFF state of the vehicular power source, a plurality of operation mode position sensors 240 for detecting the plurality of positions 412, 414, 416, 418 corresponding to the plurality of operation modes, and an actuator 260 for rotating the free rotation-type rotary dial 420 to any one of the plurality of positions 412, 414, 416, 418 based on input received by the controller 200, or for actuating a switch associated with each of the plurality of operation position sensors 240 so as to set the operation mode in any one of the plurality of positions based on input received by the controller 200 (without rotating the free rotation-type rotary dial), so as to initiate the selected vehicle lighting function. In embodiments, the free rotation-type rotary dial 420 may include a notched-tooth pattern extending along a rear side thereof.

As shown in FIG. 4C, the notched-tooth pattern of the rear side of the free rotation-type rotary dial 420 is configured to interact with the plurality of operation mode position sensors 240, e.g., via a detection switch. The controller 200 recognizes the rotation direction of the free rotation-type rotary dial such that when the free rotation-type rotary dial 420 rotates, in either the clockwise or the counter-clockwise direction, the controller 200 detects a rotation range between notched portions of the rear side of the free rotation-type rotary dial 420 and associates a given rotation range to a position on the stationary housing portion 410 corresponding to a selected operation mode. Thereafter, the controller 200 can identify the selected position 412, 414, 416, 418 and communicate with the vehicle lighting system to perform the function of the selected operation mode.

To detect a rotation range of the free rotation-type rotary dial 420 for purposes of selecting an operation mode, it is contemplated that the free rotation-type rotary dial 420 or the stationary housing portion 410 may serve as a momentary-type push button to actuate the detection switch to trigger operation of the rotary switch to determine the operation mode based on a given rotation of the free rotation-type rotary dial 420.

In operation, when the vehicular power state is OFF, regardless of the operation mode identified by the selection indicators 432, 434, 436, 438 at any one of the plurality of positions 412, 414, 416, 418 on the stationary housing portion 410, the controller 200 controls the free rotation-type rotary switch 400 to automatically set the operation mode (without rotation of the free rotation-type rotary dial 420) to the predetermined initial-operation mode corresponding to the initial-operation position 418 such that when the vehicular power state is ON, the predetermined initial-operation mode is actuated. In embodiments, it is contemplated that controller 200 controls the free rotation-type rotary dial 420 (via the actuator 260) to automatically rotate to the initial-operation position 418 corresponding to the predetermined initial-operation mode. As shown in FIGS. 4A and 4B, when the vehicular power source is OFF, the operation mode switches from the TAIL function to the AUTO function, the predetermined initial-operation mode.

Figure 5:
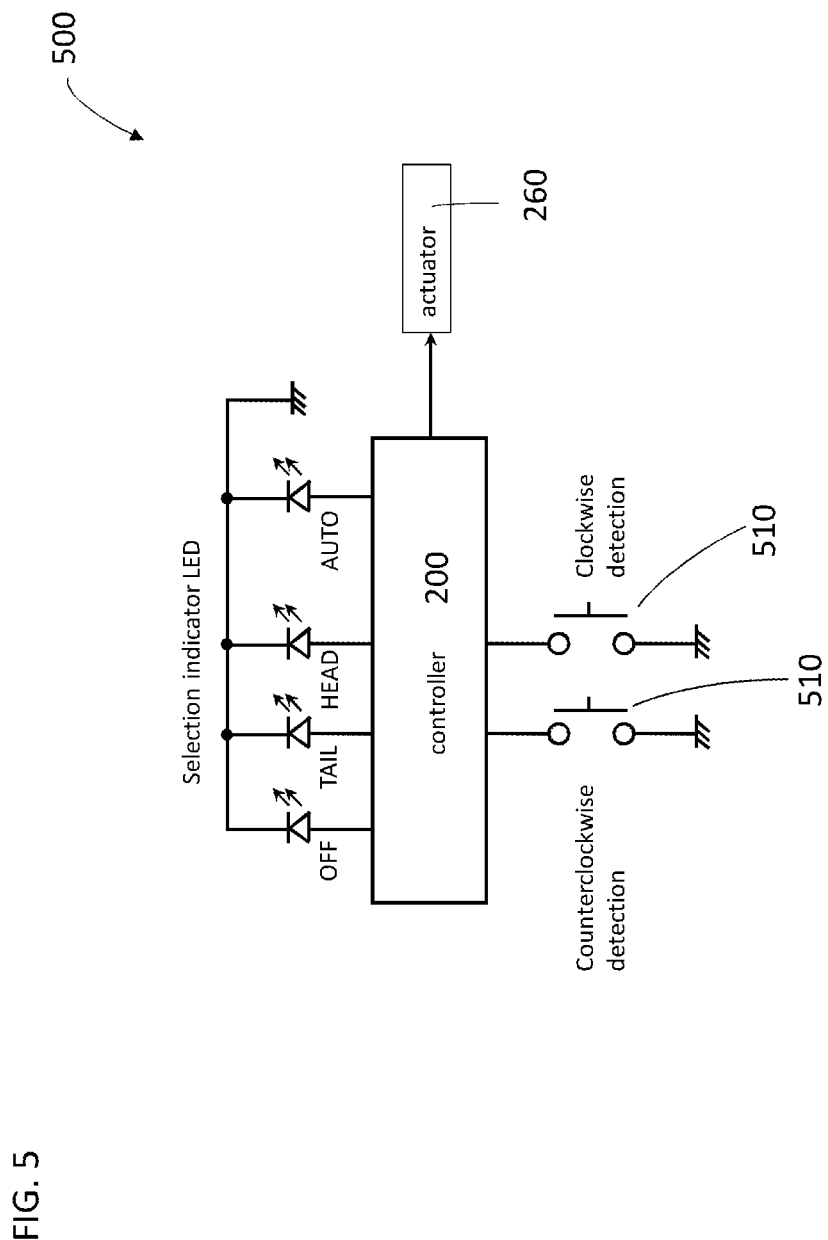
FIG. 5 shows an exemplary, non-limiting embodiment of a rotary-type switch electrical circuit suitable for use with a free rotation-type rotary switch, according to aspects of the present disclosure.
Figure 8B:
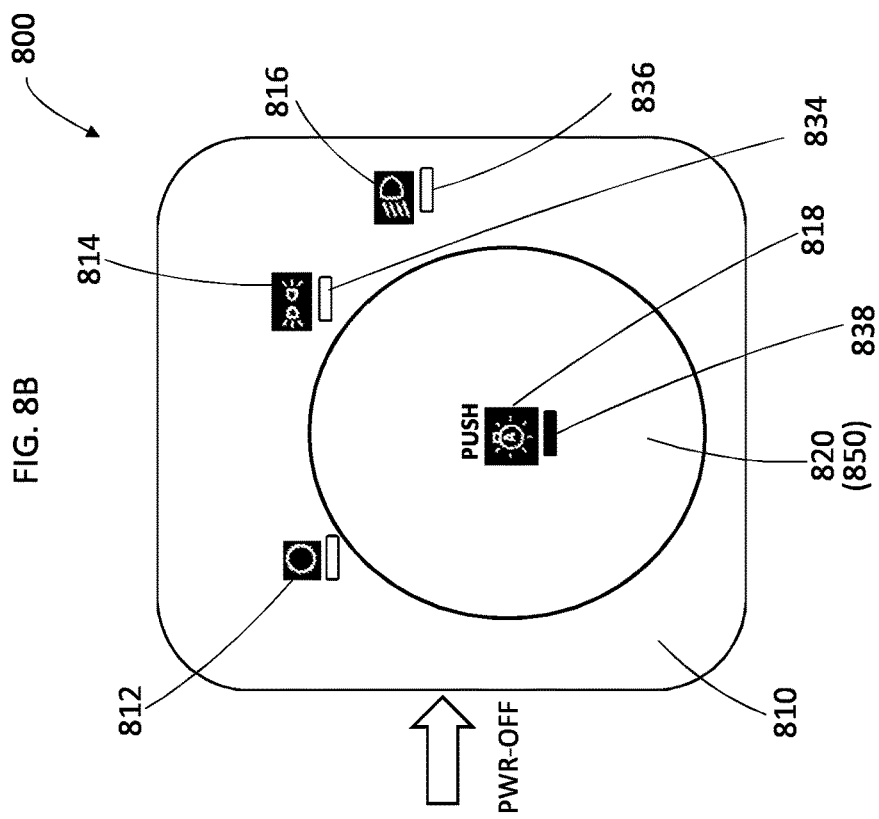
FIGS. 8A and 8B show an exemplary, non-limiting embodiment of a momentary-type rotary switch, according to aspects of the present disclosure.
Figure 8A:
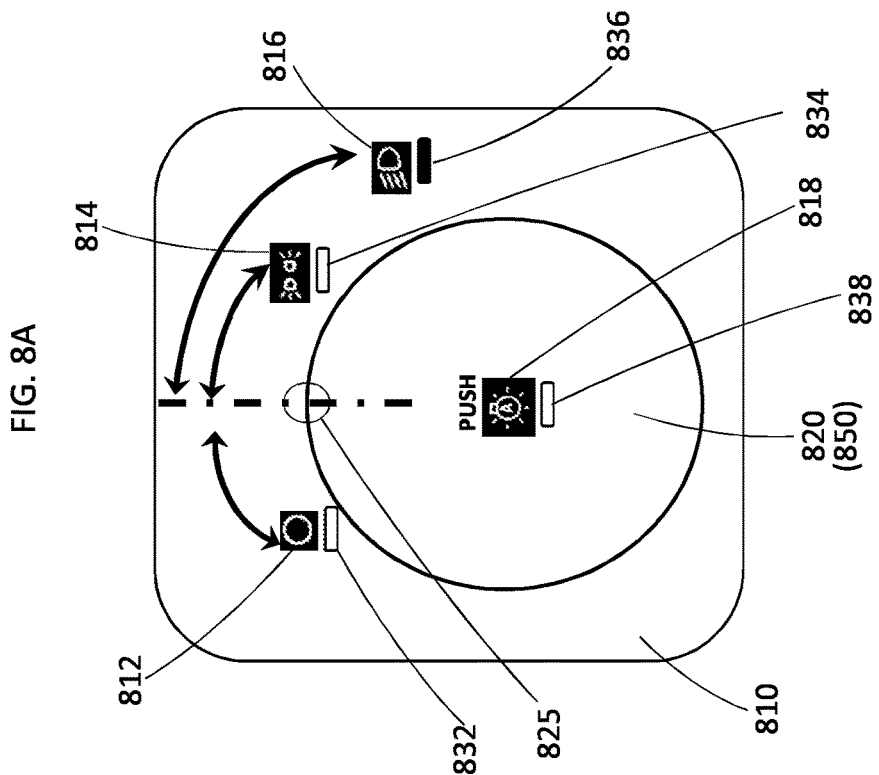

As shown in FIG. 5, a rotary-type switch electrical circuit 500 suitable for use with the free rotation-type rotary switch 400 is provided. When the vehicle power source is ON, the free rotation-type rotary dial 420, movable in either the clockwise or counterclockwise direction, may be rotated within a rotation range such that a switch 510 corresponding to each of the plurality of positions 412, 414, 416, 418 on the stationary housing portion 410 may be actuated. When the free rotation-type rotary dial 420 actuates the switch corresponding to any of the plurality of positions 412, 414, 416, 418 the circuit is complete and the controller 200 communicates with the vehicle lighting system to perform the function of the selected operation mode that corresponds to the actuated switch.

When the vehicle power source is OFF, regardless of the position associated with the selected operation mode, the controller 200 communicates with the actuator 260 to rotate the free rotation-type rotary dial 420 to the position corresponding to the predetermined initial-operation mode or automatically actuates the switch corresponding to the predetermined initial-operation mode (without rotation of the free rotation-type rotary dial 420). Once the switch is actuated, the circuit is complete and when the controller 200 detects that the vehicular power state is switched ON, the controller 200 communicates with the vehicle lighting system to actuate the function of the predetermined initial-operation mode. In embodiments, when the free rotation-type dial 420 is rotated further from an end rotation position corresponding to an operation mode, such further rotation indicates to the controller 200 that the operation mode corresponds to an OFF function even when the position corresponding to the OFF function is provided at the opposite side of the free rotation-type rotary dial 420.

In embodiments, the selection indicators 432, 434, 436, 438 are illuminable light sources (e.g., LED) that illuminate when movement of the free rotation-type rotary dial 420 within the rotation range corresponds to a position associated with a selected operation mode. In embodiments, the selection indicators 432, 434, 436, 438 may illuminate in conjunction with illumination of a symbol identifying the function of the selected operation mode on the stationary housing portion 410. In addition, the illuminated light sources may have one of or any combination of multi-color, flashing or intermittent lighting functionality as well.

A non-limiting embodiment of another latch-type rotary switch 600 will be described with reference to FIGS. 2, 3, 6A and 6B. Inasmuch as the structure of latch-type rotary switch 600 is similar to that described with respect to the embodiment of FIGS. 1A and 1B similar reference numbers are used to refer to those components previously described and thus further detail of the structure is not described below. Thus, as shown, e.g., in FIGS. 6A and 6B, in addition to a stationary housing portion 610 and a latch-type rotary dial 620, the latch-type rotary switch 600 further includes a push button 650 provided such that the stationary housing portion 610 is located between the latch-type rotary dial 620 and the push button 650. In embodiments, the push button 650 is provided at a central section of the stationary housing portion 610 flanked by a plurality of symbols representing the various vehicle lighting system operation modes around an outer periphery thereof. This arrangement prioritizes the operation mode located on the push button 650. That is, no matter what position the latch-type rotary dial 620 is at, the operation mode defined by actuation of the push button 650 only requires a single action. In embodiments, the AUTO function is associated with the push button 650 to set a prioritized operation mode. Arranging the AUTO function on the push button 650 makes it readily accessible and thus increases priority of the function and safety to the motorist.

The push button 650 defines a position corresponding to one of the plurality of operation modes. The selection of the operation mode defined by the push button 650 is identified by a selection indicator 660 on the push button 650 itself, separate from the selection indicator 630 provided on the latch-type rotary dial 620 that is provided to align with and identify selection of the other operations modes 612, 614, 616. The operation mode identified by the selection indicator 660 on the push button 650 is actuated when the push button 650 receives a force to move the same relative to both the stationary housing portion 610 and the latch-type rotary dial 620. In embodiments, the push button 650 is movable relative to both the stationary housing portion 610 and the latch-type rotary dial 620 in an axial direction relative to a rotation direction of the latch-type rotary dial 620, although it is contemplated that the push button 650 may be a toggle-type or multi-directional push button to enhance functionality of the latch-type rotary switch 600 (including more than one prioritized operation mode). For example, each toggle direction or directional deflection may correspond to a different prioritized operation mode provided on the push button 650. In embodiments, the push button 650 may also be a momentary-type style push button.

As shown in FIG. 2, the rotary-type switch control system controller 200 is configured to control a position of the latch-type rotary dial 620 corresponding to one of the plurality of operation modes of the rotary-type switch based on one of an OFF vehicular power state or an ON vehicular power state as well. As shown, the controller 200 is connected to at least one power switch 220 for detecting the ON/OFF state of the vehicular power source, the plurality of operation mode position sensors 240 for detecting the plurality of positions 612, 614, 616, 618 corresponding to the plurality of operation modes, and an actuator 260 for rotating the latch-type rotary dial 620 to any one of the plurality of positions 612, 614, 616, so as to initiate the selected vehicle lighting function. The controller 200 is also configured to actuate the rotary switch (without rotation of the latch-type rotary dial 620) to be in position 618 on the push button 650 based on input received by the controller 200.

In operation, while the vehicular power state is ON, when the push button 650 is actuated, regardless of the selected operation mode corresponding to the position identified by the selection indicator 630, the controller 200 controls the latch-type rotary switch 600 to automatically set the operation mode to the operation mode defined by actuation of the push button 650 and the selection indicator 660 is illuminated to identify the selection. It is noted that when the selection indicator 660 is illuminated, and the push button 650 is again depressed, controller 200 may be configured to switch the operation mode from AUTO to OFF or to the operation mode identified by selection indicator 630. In addition, when the vehicular power state is OFF, regardless of the position of the selection indicator 630 or 660 corresponding to the selected operation mode, the controller 200 controls the latch-type rotary switch 600 to automatically set the operation mode to a predetermined initial-operation mode corresponding to an initial-operation position at one of either the push button 650 or one of the plurality of positions 612, 614, 616 at the stationary housing portion 610, such that when the vehicular power state is ON, the predetermined initial-operation mode is actuated. As shown in FIGS. 6A and 6B, when the vehicular power source is OFF, the operation mode switches from the TAIL function identified by the selection indicator 630 to the AUTO function (the predetermined initial-operation mode) identified by the selection indicator 660.

In embodiments, the push button 650 is set to be the initial-operation position 618 corresponding to the predetermined initial-operation mode, and when the vehicular power state is OFF, regardless of the position of the selection indicator 630 or 660 corresponding to the selected operation mode, the controller 200 controls the latch-type rotary switch 600 to automatically set the operation mode to the predetermined initial-operation mode corresponding to the initial-operation position 618 at the push button 650 such that when the vehicular power state is ON, the predetermined initial-operation mode is actuated. As shown, e.g., in FIGS. 6A and 6B, the predetermined initial-operation mode is AUTO.

A non-limiting embodiment of a further latch-type rotary switch 700 will be described with reference to FIGS. 2, 3, 7A and 7B. Inasmuch as the structure of latch-type rotary switch 700 is similar to that described with respect to the embodiment of FIGS. 1A, 1B, 6A and 6B similar reference numbers are used to refer to those components previously described and thus further detail of the structure is not described below.

As shown in FIGS. 7A and 7B, one of the plurality of positions corresponding to one of the plurality of operation modes is a position defined at the push button 750 that is provided at the stationary housing portion 710 and identified by indicia 760 provided on the push button 750 itself. Another one of the plurality of positions defined outside of the push button 750 is designated as the initial-operation position 718 corresponding to the predetermined initial-operation mode. While the operation mode identified by indicia 760 is disclosed, it is contemplated that the operation mode of the push button 750 may also be identified by a selection indicator as well.

As shown in FIG. 2, the controller 200 is configured to control position of the latch-type rotary dial 720 corresponding to one of the plurality of operation modes of the rotary-type switch based on one of an OFF vehicular power state or an ON vehicular power state as well. As shown, the controller 200 is connected to at least one power switch 220 for detecting the ON/OFF state of the vehicular power source, the plurality of operation mode position sensors 240 for detecting the plurality of positions 712, 714, 716, 718 corresponding to the plurality of operation modes, and an actuator 260 for rotating the latch-type rotary dial 720 to any one of the plurality of positions 714, 716, 718 so as to initiate the selected vehicle lighting function. The controller 200 is also configured to actuate the latch-type rotary switch 700 (without rotation of the latch-type rotary dial 720) to be in the position 712 on the push button 750 based on input received by the controller 200.

In operation, when the vehicular power state is OFF, regardless of the position identified by selection indicator 730 or 770 corresponding to the selected operation mode, the controller 200 controls the latch-type rotary dial 720 to automatically rotate the selection indicator 730 to the initial-operation position 718 corresponding to the predetermined initial-operation mode such that when the vehicular power state is ON, the predetermined initial-operation mode is actuated. As shown in FIGS. 7A and 7B, when the vehicular power state is OFF, both selection indicators 730 and 770 identify the predetermined initial-operation mode selection. It is noted that while both selection indicators 730 and 770 are illuminated, it is contemplated that only one of the selection indicators 730 and 770 is illuminated.

As shown in FIG. 3, the rotary-type electrical circuit 300 is suitable for use with both latch-type rotary switches 600 and 700 as well. When the vehicle power source is ON, the latch-type rotary dial 620 (720) may be rotated such that a switch 310 corresponding to each of the plurality of positions 612 (712), 614 (714), 616 (716), 618 (718) on the stationary housing portion 610 (710) may be actuated. When the latch-type rotary dial 620 (720) aligns with any one of the plurality of positions the corresponding switch is actuated to complete the circuit and the controller 200 communicates with the vehicle lighting system to perform the function of the selected operation mode that corresponds to the actuated switch. When the vehicle power source is OFF, regardless of the aligned position of the selection indicator and the selected operation mode, the switch corresponding to the predetermined initial-operation mode is actuated and the controller 200 in turn communicates with the actuator 260 to automatically set the operation mode to a predetermined initial-operation mode corresponding to an initial-operation position at one of either the push button 650 (position 618) or position 718 at the stationary housing portion 710, such that when the vehicular power state is ON, the predetermined initial-operation mode is actuated. Thus, when the controller 200 detects that the vehicular power state is switched ON, the controller 200 communicates with the vehicle lighting system to actuate the function of the predetermined initial-operation mode.

A non-limiting embodiment of a momentary-type rotary switch 800 will be described with reference to FIGS. 2, 8A, 8B, 10A, 10B, 10C and 11. The momentary-type rotary switch 800 includes a panel portion 810 that includes a plurality of positions 812, 814, 816 that respectively correspond to a plurality of operation modes of the rotary-type switch, wherein each position of the plurality of positions 812, 814, 816 may include a selection indicator 832, 834, 836 that identifies a selected operation mode. The momentary-type rotary switch 800 also includes a momentary-type rotary dial 820 that is biased toward a home position 825 and configured to rotate relative to the panel portion 810 and select one of the plurality of operation modes at the corresponding position identified by the corresponding selection indicators 832, 834, 836 on the panel portion 810. The momentary-type rotary dial 820 may also serve as a push button 850.

The push button 850 includes a prioritized-access position 818 corresponding to a prioritized-access operation mode and identified by a prioritized-access selection indicator 838 on the push button 850 itself. The selection indicator 838 is separate from the selection indicators 832, 834, 836 provided on the panel portion 810 to identify selection of the other operations modes. The operation mode identified by the selection indicator 838 on the push button 850 is actuated when the push button 850 receives a force to move the same relative to the panel portion 810. In embodiments the push button 850 is movable relative to the panel portion 810 in an axial direction relative to a rotation direction of the momentary-type rotary dial 820. This arrangement prioritizes the operation mode located on the push button 850 similar to that discussed with respect to push buttons 650 and 750 described above. That is, no matter what operation mode has been selected, the operation mode defined by actuation of the push button 850 only requires a single action. In embodiments, the AUTO function is associated with the push button 850 and is the prioritized-access operation mode. Arranging the AUTO function on the push button 850 makes it readily accessible and thus increases priority of the function and safety to the motorist. In embodiments, it is contemplated that the push button 850 may be a toggle-type or multi-directional push button to enhance functionality of the momentary-type rotary switch 800 (including more than one prioritized operation mode). For example, each toggle direction or directional deflection may correspond to a different prioritized operation mode provided on the push button 850. In embodiments, the push button 850 may also be a momentary-type style push button.

As will be described in detail below, the momentary-type rotary dial 820 has a pushing shape profile such that a change in altitude of a pusher of a sensor corresponds to a change in operation mode so that when the dial 820 rotates, the momentary-type rotary switch 800 recognizes the position based on the change in altitude of the pusher and actuates the operation mode corresponding to the selected function of the vehicle lighting system.

As shown in FIG. 2, the controller 200 is configured to control a position of the momentary-type rotary dial 820 corresponding to one of the plurality of operation modes of the rotary-type switch based on one of an OFF vehicular power state or an ON vehicular power state as well. As shown, the controller 200 is connected to at least one power switch 220 for detecting the ON/OFF state of the vehicular power source, the plurality of operation mode position sensors 240 for detecting the plurality of positions 812, 814, 816, 818 corresponding to the plurality of operation modes, and an actuator 260 for momentarily rotating the momentary-type rotary dial 820 to actuate the rotary switch to be in any one of the plurality of positions 812, 814, 816 identified by the selection indicators 832, 834, 836 provided on the panel portion or for actuating the momentary-type rotary switch 800 to be in the prioritized access position 818 on the momentary-type rotary dial 820 identified by the selection indicator 838 based on input received by the controller 200.

In embodiments, when the push button 850 is actuated, regardless of the selected operation mode on either the panel portion 810 or the push button 850, the controller 200 controls the momentary-type rotary switch 800 to set the operation mode to that defined by actuation of the push button 850. In addition, when the vehicular power state is OFF, regardless of the position identified by the selection indicator corresponding to the selected operation mode on either the panel portion 810 or the momentary-type rotary dial 820, the controller controls the momentary-type rotary switch 800 to either automatically set the operation mode to that defined by actuation of the push button 850 or that defined by one of the plurality of positions 812, 814, 816 and identified by one of the selection indicators 832, 834, 836 on the panel portion 810. In embodiments, the operation mode defined by the prioritized access position 818 is an initial-operation position corresponding to a predetermined initial-operation mode such that when the vehicular power state is ON, the predetermined initial-operation mode is actuated. In other embodiments, the operation mode defined by one of the plurality of positions 812, 814, 816 is the initial operation position.

A non-limiting embodiment of another momentary-type rotary switch 900 will be described with reference to FIGS.

2, 9A, 9B, 9C and 11. The momentary-type rotary switch 900 includes a panel portion 910 that includes a plurality of positions 912, 914, 916 that respectively correspond to a plurality of operation modes of the rotary-type switch, wherein each position of the plurality of positions 912, 914, 916 may include a selection indicator 932, 934, 936 that identifies a selected operation mode. The momentary-type rotary switch 900 also includes a momentary-type rotary dial 920 that is biased toward a home position 925 and configured to rotate relative to the panel portion 910 and select one of the plurality of operation modes at the corresponding position identified by the corresponding selection indicators 932, 934, 936 on the panel portion 910. The momentary-type rotary dial 920 may also serve as a push button 950 similar to push button 850 described above. In embodiments, the momentary-type rotary dial 920 is provided at a central section of the stationary housing portion 910 flanked by the plurality of symbols representing the various vehicle lighting system operation modes around an outer periphery thereof. This arrangement prioritizes the operation mode located on the push button 950.

In this embodiment, the momentary-type rotary switch 900 is configured to associate the number of successive rotations of the momentary-type rotary dial 920 away from the home position 925 and back with one of the plurality of positions corresponding to one of the plurality of operation modes identified by the corresponding selection indicator on the panel portion 910. Thus, as shown in FIGS. 9A and 9B, e.g., if the momentary-type rotary dial 920 is successively rotated twice in the clockwise direction, the momentary-type rotary switch 900 detects the number of rotations and associates them with the second position in the clockwise direction, which corresponds to the HEAD function of the vehicle lighting system.

As shown in FIG. 9C, both momentary-type rotary dials 820, 920 have a pushing shape profile configured to interact with a rotation detector 1003 which includes at least one pusher 1005 that communicates with the controller 200 to allow the controller 200 to determine the selected operation mode. Each pusher 1005 is provided to communicate with at least one of the operation position sensors 240 by providing feedback to the controller 200 based on a rotation of the momentary-type rotary dials 820, 920. Each pusher 1005 extends through the panel portion 810, 910 toward the momentary-type rotary dials 820, 920 and is provided below an upper surface of the momentary-type rotary dials 820, 920. Each pusher 1005 includes a contact piece 1015 that is configured to engage or contact a lower surface of a portion of the momentary-type rotary dials 820, 920 and an elastically deformable base support 1007 configured to elastically bias the pusher 1005 toward the momentary-type rotary dial 820, 920. The pusher 1005 is elastically biased toward the momentary-type rotary dials 820, 920 to initiate engagement or contact between the contact piece 1015 and the lower surface of the portion of the momentary-type rotary dials 820, 920. The contact piece 1015 is provided between the pusher 1005 and momentary-type rotary dial 820, 920 and is also elastically biased toward the momentary-type rotary dial 820, 920 by the elastically deformable base support 1007 and/or a separate spring. It is noted that the contact piece 1015 is also configured to generate a click-type feedback (e.g., haptic and/or audible feedback) to confirm to the user that the rotation of the momentary-type rotary dial 820, 920 resulted in selection of an operation mode. In embodiments, the elastically deformable base support 1007 is a rubber dome that supports the pusher 1005 from a lower side thereof. It is contemplated that each of the components of the rotation detector 1003 (i.e., the pusher 1005, the base support 1007 and the contact piece 1015) may be a single integral component or separate parts that are assembled and connected to one another.

In operation, when the momentary-type rotary dial 820, 920 is rotated, the rotation corresponds to a change in altitude of the pusher 1005. The change in altitude of the pusher 1005, in turn, corresponds to an actuation of a switch that allows the controller 200 to determine a change in operation mode. Thus, when the momentary-type rotary dial 820, 920 rotates, the momentary-type rotary switch 800, 900 recognizes the selected operation mode tinged on a rotation range or a number of turns of the dial 820, 920 so that the operation mode corresponding to the selected function of the vehicle lighting system is actuated.

Figure 10B:
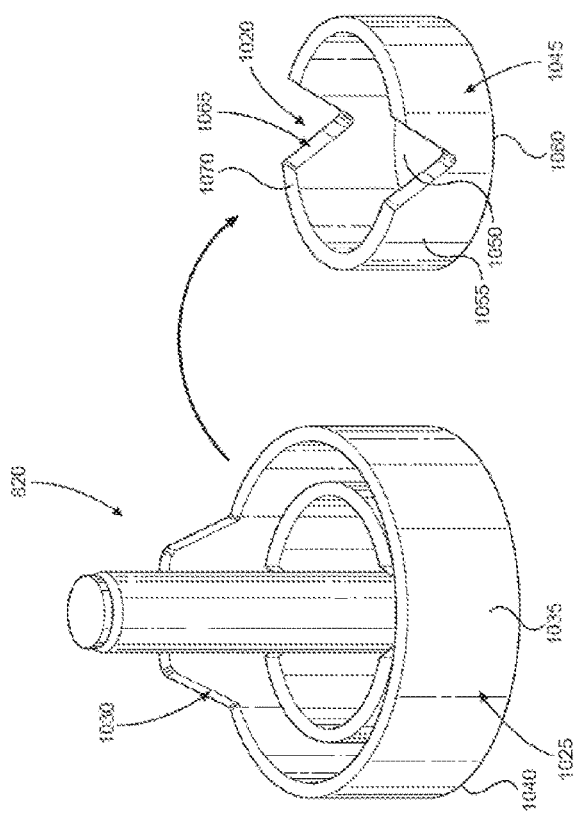
FIGS. 10A and 10B respectively show an exploded view of an exemplary, non-limiting embodiment of a momentary-type rotary switch and a perspective view of a momentary-type rotary dial, according to aspects of the present disclosure.
Figure 10A:
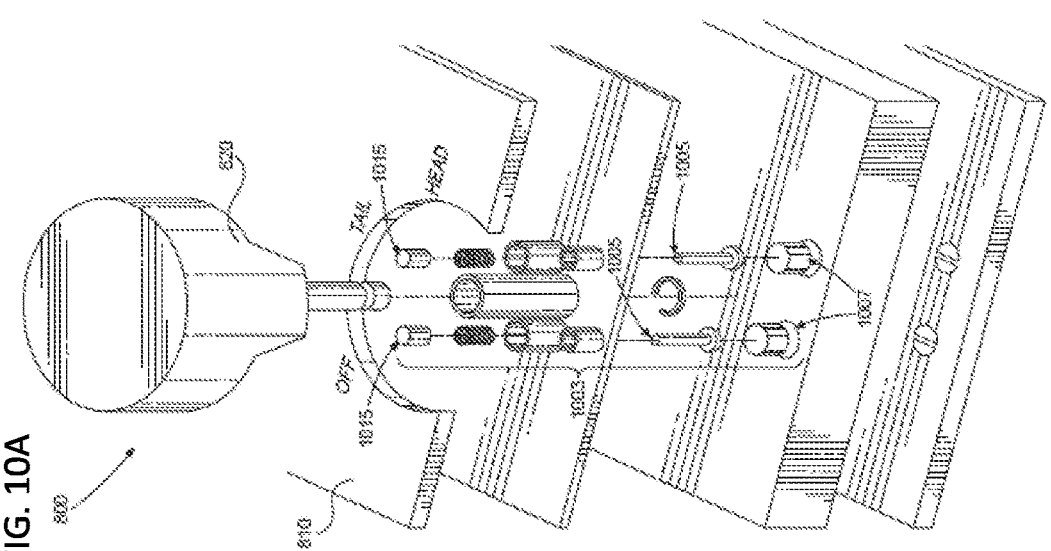
Figure 10C:
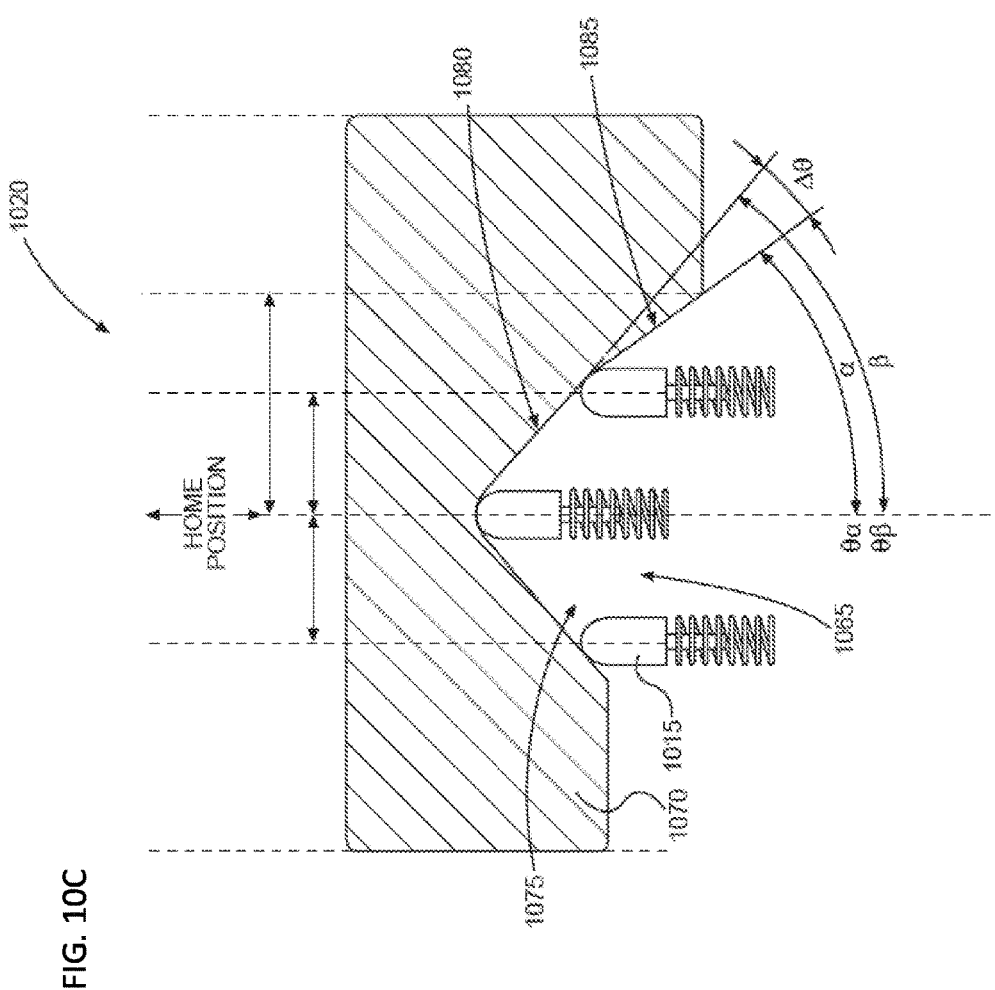
FIG. 10C shows a partial cross-sectional view of an engagement part of the momentary-type rotary dial shown in FIGS. 10A and 10B, according to aspects of the present disclosure.

FIG. 10A shows an exploded view of the momentary-type rotary switch 800 including the panel portion 810, the momentary-type rotary dial 820 and the rotation detector 1003. FIG. 10B shows a perspective view of the momentary-type rotary dial 820 including an engagement part 1020 and FIG. 10C shows a partial cross-sectional view of the engagement part 1020.

As shown in FIG. 10B, the momentary-type rotary dial 820 includes an outer housing 1025 having a recessed opening 1030 defined by outer side walls 1035 extending downward from an upper-most surface 1040 of the momentary-type rotary dial 820 toward the panel portion 810 when assembled. The engagement part 1020 is disposed within the recessed opening 1030 of the momentary-type rotary dial 820 and also extends downward from the upper-most surface 1040 toward the panel portion 810. It is noted that the engagement part 1020 may be removably disposed or integrally fixed within the recessed opening 1030 of the momentary-type rotary dial 820.

The engagement part 1020 includes an outer housing 1045 having a recessed opening 1050 defined by outer side walls 1055 extending downward from an upper-most surface 1060 of the engagement part 1020 toward the panel portion 810 when assembled. The recessed opening 1050 is configured to receive a rotary shaft that is provided to support rotation of the engagement part 1020, as well as the momentary-type rotary dial 820, relative to the panel portion 810.

The outer sidewalls 1055 of the engagement part 1020 define at least one detent 1065 provided on a rear surface 1070 thereof. Surfaces of the outer side walls 1055 defining the detent 1065 are configured to engage the at least one contact piece 1015 of the rotation detector 1003.

As shown in FIG. 10C, the detent 1065 is defined by a plurality of inclined surfaces 1075, 1080, 1085 provided along the rear surface 1070 of the outer side walls 1055. In embodiments, each of the inclined surfaces 1075, 1080, 1085 corresponds to one of the plurality of positions 812, 814, 816, corresponding to one of the plurality of operation modes identified by the corresponding selection indicators 832, 834, 836 on the panel portion 810. It is contemplated that additional inclined surfaces may be provided to define the detent 1065 and correspond to additional contemplated operation modes. In embodiments, the momentary-type rotary dial 820 is generally cylindrical, although other shapes suitable for convenient grasping and rotation of the same including, e.g., cube-shaped, polygonal-shaped or any other ergonomic shape, are contemplated.

In operation, when the momentary-type rotary dial 820 is in the home position 825, the contact piece 1015 of the rotation detector 1003 is retained within the detent 1065 of engagement part 1020. In embodiments, when the momentary-type rotary dial 820 in the home position, the contact piece 1015 is provided at an upper-most position of the detent 1065 relative to the lower-most portion of the rear surface 1070, although it is contemplated that the contact piece 1015 may alternatively be provided at the lower-most position of the detent 1065 closest to the lower-most portion of the rear surface 1070.

When the momentary-type rotary dial 820 is partially rotated within a predetermined rotation range, the contact piece 1015 engages or contacts a first inclined surface 1080 of the plurality of inclined surfaces. The first inclined surface 1080 of the plurality of inclined surfaces is thus moved relative to the contact piece 1015 to actuate the rotation detector 1003. In particular, when contacted or engaged with the first inclined surface 1080, the contact piece 1015 is urged downward against its biasing direction to actuate the pusher 1005 and deform the base support 1007, which are also urged downward against the biasing direction. As a result, when the contact piece 1015 engages or contacts the first inclined surface 1080 (during a rotation) and before the momentary-type rotary dial 820 returns to the home position 825, the rotation detector 1003 detects the rotation and communicates with one of the operation position sensors 240 connected to the controller 200 to allow the rotary-type switch 800 to determine the selected operation mode. In this embodiment, when the position is identified, the corresponding selection indicator 834 on the panel portion 810 is illuminated, and the click-type feedback from the contact piece 1015 is generated to confirm to the user that the rotation of the momentary-type rotary dial 820 resulted in selection of an operation mode.

When the momentary-type rotary dial 820 is further rotated within the predetermined rotation range during a single rotation operation (in other words, when the contact piece 1015 moves beyond the first inclined surface 1080), the contact piece 1015 is moved relative to a second inclined surface 1085 of the plurality of inclined surfaces such that the rotation detector 1003 detects the rotation and communicates with another one of the operation position sensors 240 connected to the controller 200 to allow the rotary-type switch 800 to determine the selected operation mode (identified by the corresponding selection indicator on the panel portion 810) before the momentary-type rotary dial 820 returns to the home position. In this embodiment, when the position is identified, the corresponding selection indicator 836 on the panel portion 810 is illuminated, and the click-type feedback from the contact piece 1015 is generated to confirm to the user that the rotation of the momentary-type rotary dial 820 resulted in selection of another operation mode.

To differentiate between selected operation modes, the engagement part 1020 is designed such that the first inclined surface 1080 has a slope angle $\theta\alpha$ different than a slope angle $\theta\beta$ of the second inclined surface 1085. The difference in slope angle $\Delta\theta$ between the inclined surfaces 1080 and 1085 corresponds to a change in altitude of the rotation detector 103 (i.e., the pusher 1005, the base support 1007, and the contact piece 1015) when the momentary-type rotary dial 820 is rotated. This configuration allows the controller 200 and the momentary-type rotary switch 800 to associate different inclined surfaces with different positions and their respective corresponding operation modes.

Figure 11:
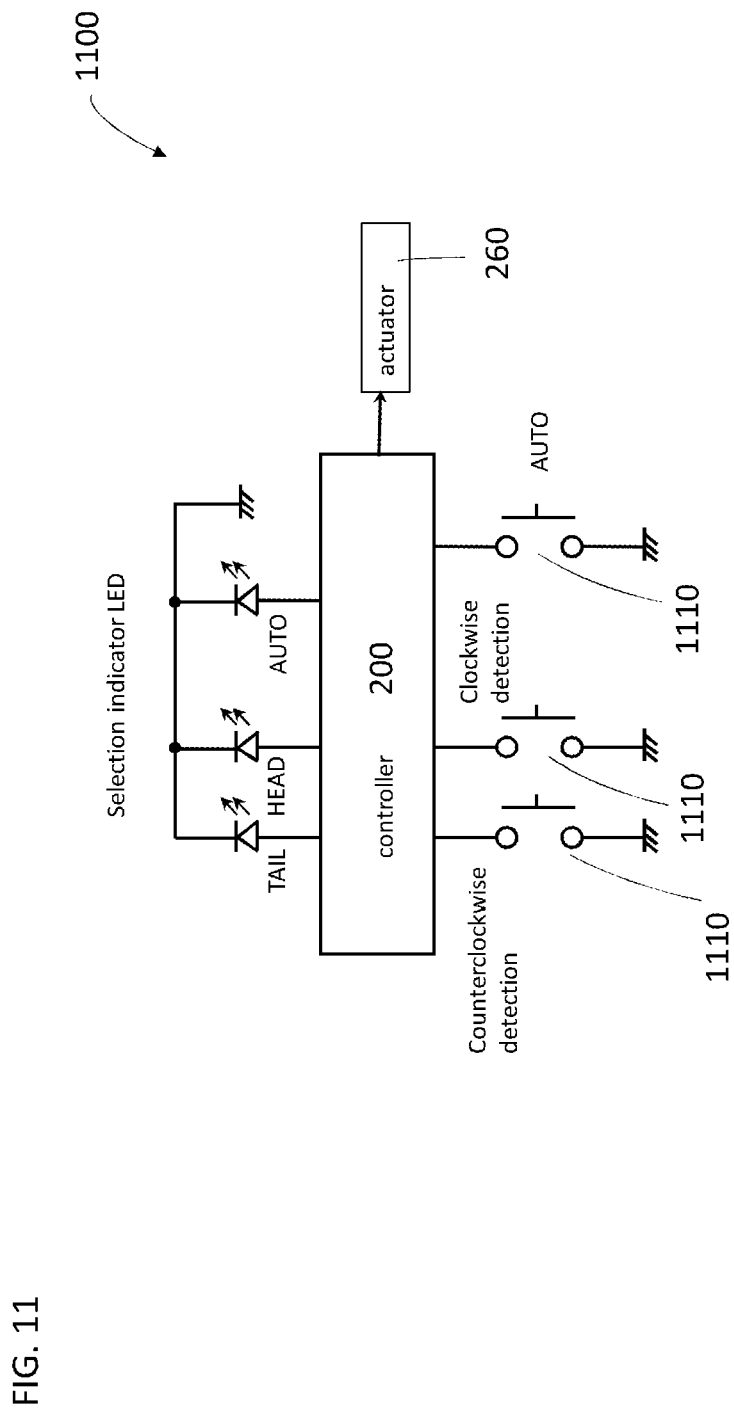
FIG. 11 shows an exemplary, non-limiting embodiment of a rotary-type switch electrical circuit suitable for use with a momentary-type rotary switch, according to aspects of the present disclosure.

As shown in FIG. 11, the rotary-type switch electrical circuit 1100 is suitable for use with both momentary-type rotary switches 800 and 900. When the vehicle power source is ON, the momentary-type rotary dial 820 (920) may be momentarily rotated or pushed such that a switch 1110 corresponding to each of the plurality of positions 812 (912), 814 (914), 816 (916), 818 (918) on the panel portion 810 (910) may be actuated. When the rotation or depression of the momentary-type rotary dial 820(920) actuates the switch 1110 corresponding to any one of the plurality of positions the circuit is complete and the controller 200 communicates with the vehicle lighting system to perform the function of the selected operation mode that corresponds to actuated switch. When the vehicle power source is OFF, regardless of the selected operation mode, the controller 200 automatically actuates the switch to set the operation mode to a predetermined initial-operation mode corresponding to an initial-operation position at one of either the push button 850 (950) or the designated position at the panel portion 810 (910), such that when the vehicular power state is ON, the predetermined initial-operation mode is actuated. When the controller 200 detects that the vehicular power state is switched ON, the controller 200 communicates with the vehicle lighting system to actuate the function of the predetermined initial-operation mode.

Accordingly, the rotary-type switches described above enable vehicle lighting to be controlled in a way that reduces the necessity of user input to minimize user error and improve motorist safety.

While the rotary-type switches have been described with reference to several exemplary embodiments, it is understood that the words that have been used are words of description and illustration, rather than words of limitation. Changes may be made within the purview of the appended claims, as presently stated and as amended, without departing from the scope and spirit of the rotary dial assembly in its aspects. Although the rotary-type switches have been described with reference to particular means, materials and embodiments, the rotary-type switches are not intended to be limited to the particulars disclosed; rather the described rotary-type switch configurations should be considered to extend to all functionally equivalent structures, methods, and uses such as are within the scope of the appended claims.

Although the present specification may describe components and functions that may be implemented in particular embodiments with reference to particular standards and protocols, the disclosure is not limited to such standards and protocols. For example, components of the non-limiting embodiments of the various electrical circuits represent examples of the state of the art. Such standards are periodically superseded by equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A rotary-type switch for controlling vehicle lighting, comprising:
    a stationary housing portion that includes a plurality of positions that respectively correspond to a plurality of operation modes of the rotary-type switch; and
    a latch-type rotary dial that includes a selection indicator and surrounds the stationary housing portion, the latch-type rotary dial being configured to selectively rotate relative to the stationary housing portion to align the selection indicator with one of the plurality of positions for an operation mode selection, wherein
    a controller is configured to control a position of the latch-type rotary dial corresponding to one of the plurality of operation modes of the rotary-type switch based on one of an OFF vehicular power state or an ON vehicular power state,
    the plurality of positions includes a position that is defined by a push button that is provided at the stationary housing portion,
    the plurality of operation modes includes an operation mode defined by actuation of the push button,
    when the push button is actuated, regardless of the selected operation mode corresponding to the position identified by the selection indicator, the controller controls a plurality of electrical circuit switches corresponding to the plurality of operation modes of the rotary-type switch to automatically set the operation mode to the operation mode defined by actuation of the push button,
    the plurality of positions includes an initial-operation position corresponding to a predetermined initial-operation mode of the plurality of operation modes, and
    when the vehicular power state is OFF, regardless of the position of the selection indicator corresponding to the selected operation mode, the controller controls the plurality of electrical circuit switches corresponding to the plurality of operation modes of the rotary-type switch to automatically set the operation mode to the predetermined initial-operation mode corresponding to the initial-operation position such that when the vehicular power state is ON, the predetermined initial-operation mode is actuated.

2. The rotary-type switch of claim 1, wherein
    the position of the push button is the initial-operation position corresponding to the predetermined initial-operation mode, and
    when the vehicular power state is OFF, regardless of the position of the selection indicator corresponding to the selected operation mode, the controller controls the plurality of electrical circuit switches corresponding to the plurality of operation modes of the rotary-type switch to automatically set the operation mode to the predetermined initial-operation mode corresponding to the initial-operation position at the push button such that when the vehicular power state is ON, the predetermined initial-operation mode is actuated.

3. The rotary-type switch of claim 1,
    one of the plurality of positions defined outside of the push button is the initial-operation position corresponding to the predetermined initial-operation mode, and
    when the vehicular power state is OFF, regardless of the position of the selection indicator corresponding to the selected operation mode, the controller controls an actuator to automatically rotate the selection indicator to the initial-operation position corresponding to the predetermined initial-operation mode such that when the vehicular power state is ON, the predetermined initial-operation mode is actuated.

4. A rotary-type switch for controlling vehicle lighting, comprising:
    a panel portion that includes a plurality of positions that respectively correspond to a plurality of operation modes of the rotary-type switch, wherein each position of the plurality of positions includes a selection indicator that identifies a selected operation mode; and
    a momentary-type rotary dial that is biased toward a home position and configured to rotate relative to the panel portion and select one of the plurality of operation modes at the corresponding position identified by the corresponding selection indicator on the panel portion, the momentary-type rotary dial including a prioritized-access position corresponding to a prioritized-access operation mode identified by a prioritized-access selection indicator defined at a push button provided on the momentary-type rotary dial, wherein
    a controller is configured to control an operation mode of the rotary-type switch based on one of an OFF vehicular power state or an ON vehicular power state,
    when the push button is actuated, regardless of the selected operation mode on either the panel portion or the push button, the controller controls the rotary-type switch to set the operation mode to that defined by actuation of the push button, and when the vehicular power state is OFF, regardless of the position of the selection indicator corresponding to the selected operation mode on either the panel portion or the push button, the controller controls a plurality of electrical circuit switches corresponding to the plurality of operation modes of the rotary-type switch to automatically set the operation mode to a predetermined initial-operation mode defined by an initial-operation position corresponding to one of either the push button or one of the plurality of positions on the panel portion, such that when the vehicular power state is ON, the predetermined initial-operation mode is actuated.

5. The rotary-type switch of claim 4, wherein
the momentary-type rotary dial includes a detent on a rear surface thereof that is configured to engage a rotation detector,
the detent is defined by a plurality of inclined surfaces, each of the inclined surfaces corresponding to one of the plurality of positions corresponding to one of the plurality of operation modes identified by the corresponding selection indicator on the panel portion,
when the momentary-type rotary dial is in the home position, a portion of the rotation detector is retained within the detent,
when the momentary-type rotary dial is partially rotated within a predetermined rotation range, a first inclined surface of the plurality of inclined surfaces moves relative to the rotation detector such that the rotary-type switch is actuated to select one of the plurality of operation modes identified by the corresponding selection indicator on the panel portion, and
when the momentary-type rotary dial is further rotated within the predetermined rotation range, the rotation detector is moved relative to a second inclined surface of the plurality of inclined surfaces such that the rotary-type switch is actuated to select another one of the plurality of operation modes identified by the corresponding selection indicator on the panel portion, the first inclined surface having a slope angle different than a slope angle of the second inclined surface such that a change in slope angle between any of the plurality of inclined surfaces corresponds to a different position and operation mode identified by the corresponding selection indicator on the panel portion.

6. The rotary-type switch of claim 4, wherein
the rotary-type switch is configured to associate the number of rotations of the momentary-type rotary dial away from the home position and back with one of the plurality of positions corresponding to one of the plurality of operation modes identified by the corresponding selection indicator on the panel portion, and
the selection indicator is an illuminable light source.

* * * * *